United States Patent [19]
White

[11] Patent Number: 5,388,625
[45] Date of Patent: Feb. 14, 1995

[54] TIRE HAVING TREAD WITH IMPROVED WEAR RESISTANCE

[75] Inventor: Timothy A. White, Greer, S.C.

[73] Assignee: Michelin Recherche et Technique S.A., Granges-Paccot, Switzerland

[21] Appl. No.: 71,869

[22] Filed: Jun. 3, 1993

Related U.S. Application Data

[63] Continuation of Ser. No. 762,597, Sep. 19, 1991, abandoned.

[51] Int. Cl.⁶ .............................................. B60C 11/12
[52] U.S. Cl. ........................... 152/209 R; 152/DIG. 3
[58] Field of Search ........ 152/209 R, 209 D, DIG. 3; D12/146–147

[56] References Cited

U.S. PATENT DOCUMENTS

| | | | |
|---|---|---|---|
| D. 334,367 | 3/1993 | White | D12/147 |
| D. 334,368 | 3/1993 | White | D12/147 |
| 4,055,209 | 10/1977 | Senger | 152/209 R |
| 4,217,942 | 8/1980 | Takigawa et al. | 152/209 R |
| 4,479,525 | 10/1984 | Graas | 152/209 R |
| 4,667,718 | 5/1987 | Fontaine | 152/209 R |
| 4,794,965 | 1/1989 | Lagnier | 152/209 R |
| 4,815,512 | 3/1989 | Gerresheim et al. | 152/209 R |
| 4,945,966 | 8/1990 | Ogawa . | |
| 4,994,126 | 2/1991 | Lagnier . | |
| 5,062,461 | 11/1991 | Noguchi | 152/209 R |
| 5,078,190 | 1/1992 | Wissbrock et al. | 152/209 R |
| 5,147,478 | 9/1992 | Nock et al. | 152/209 R |

FOREIGN PATENT DOCUMENTS

| | | | |
|---|---|---|---|
| 0075760 | 4/1983 | European Pat. Off. | 152/209 D |
| 2216002 | 6/1989 | European Pat. Off. | 152/209 D |
| 0116511 | 6/1985 | Japan . | |
| 2-060806 | 3/1990 | Japan . | |
| 0310109 | 12/1990 | Japan | 152/209 D |
| 3-109107 | 5/1991 | Japan | 152/209 D |
| 3-167008 | 7/1991 | Japan . | |
| 3-186403 | 8/1991 | Japan | 152/209 R |
| 4-027605 | 1/1992 | Japan . | |

*Primary Examiner*—Caleb Weston
*Assistant Examiner*—Nancy T. Krawczyk
*Attorney, Agent, or Firm*—Robert R. Reed; Alan A. Csontos

[57] ABSTRACT

A tread for a tire having a mid-circumferential plane. The tread comprises a plurality of tread elements arranged in a circumferential array about the tire. The tread also comprises a plurality of transverse extending grooves. Each of the grooves separate a pair of circumferentially adjacent tread elements. An area moment of inertia is associated with each of the tread elements when viewed normal to the tread element. Each of the area moments of inertia have a respective pair of principle axes of inertia relative to the mid-circumferential plane. The angular orientation between any pair of principle axes of inertia of different tread elements is within a predetermined angular range of 40 degrees or less.

12 Claims, 5 Drawing Sheets

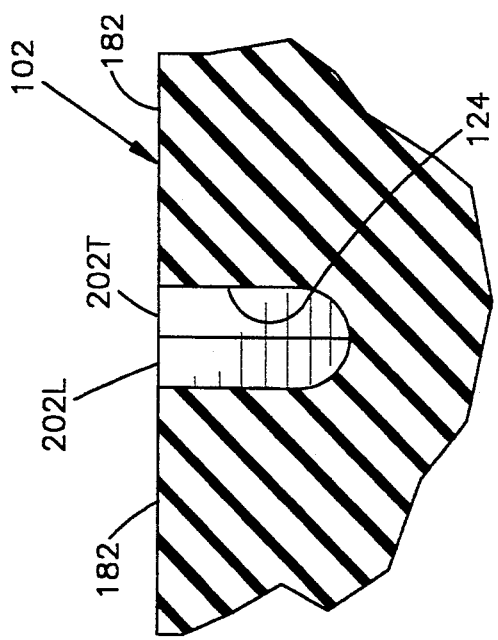
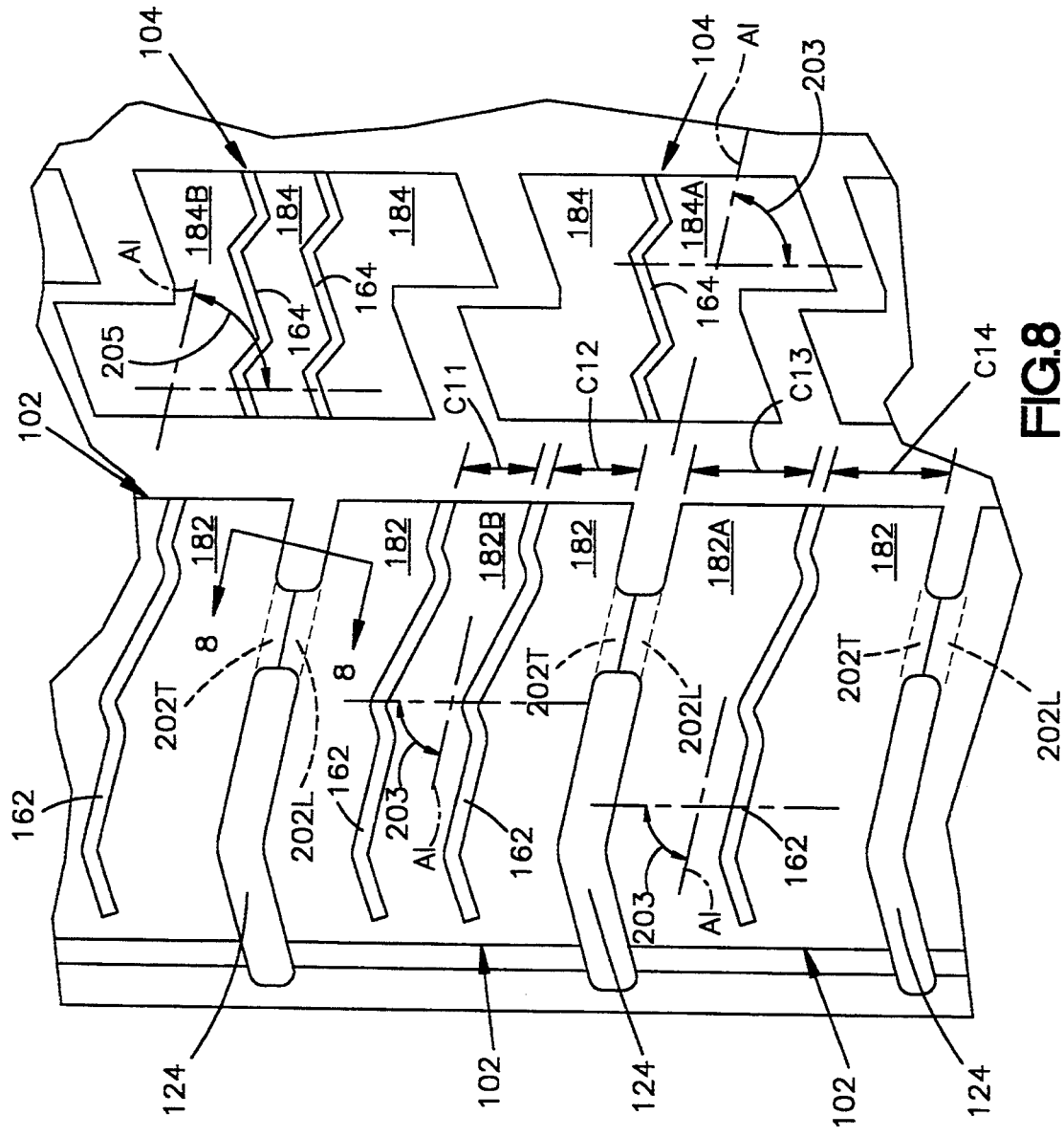
FIG.9
FIG.8

TIRE HAVING TREAD WITH IMPROVED WEAR RESISTANCE

This is a continuation of application(s) Ser. No. 07/762,597, filed on Sep. 19, 1991, now abandoned.

BACKGROUND OF THE INVENTION

1. Field of the Invention

The present invention relates to a tread for a vehicle tire. In particular, the present invention relates to improvements to the tread of an all season tire and which improvements enable relatively long and relatively even wear of tread elements of the tire.

2. Background of the Invention

An all season type of tire is known in the industry. A typical all season tire includes a tread having relatively wide transverse extending grooves providing a plurality of discrete tread elements arrange in a circumferential array around the periphery of the tire. The relatively wide transverse grooves are necessary in order to efficiently evacuate water and snow from between a rotating tire and a ground surface.

The introduction of the relatively wide transverse grooves in an early all season tire gave rise to a relatively noisy tire. The relatively high noise generated by such a tire generally became objectionable to vehicle occupants. To correct the relatively high noise problem, tire designers began creating tread elements having different circumferential pitch lengths. By differing the circumferential pitch lengths, additive sound frequencies which created the objectionable noise are minimized.

However, the varied circumferential pitch lengths associated with the tread elements also possess varied stiffness characteristics. That is, each tread element of varied circumferential pitch length has a varied stiffness characteristic which resists movement of the tread element in the circumferential and lateral directions as the tire rotates through the contact patch.

Such differences in circumferential stiffness often causes irregular wear among the tread elements on the same tire. Furthermore, scrubbing, defined as the relative motion or movement between the tread surface and the ground surface at the interface between the tire and the ground, of each individual tread element is the principle cause of wear. This scrubbing phenomena often occurs with relatively large or stiff tread elements. Thus, improvements to reduce irregular and accelerated wear of tread elements, especially in an all season tire, are continually being sought.

Varying the number of sipes in a tread element has been done in previous tire designs primarily in order to compliment aesthetic features of the tire and give some improved traction in snow. Furthermore, these sipes were typically introduced to extend a radial depth which is less than the radial depth circumferential or transverse grooves.

SUMMARY OF THE INVENTION

The present invention is directed to an improved tread for an all season type of vehicle tire. The tread of the present invention displays relatively long wear accompanied by relatively even wear from tread element to tread element.

The tread of the present invention is intended to be incorporated on a tire having a mid-circumferential plane. The tread comprises a plurality of tread elements arranged in a circumferential array about the outer periphery of the tire. The tread also includes a plurality of transversely extending grooves. Each of the transverse grooves separate a pair of circumferentially adjacent tread elements. At least one full depth sipe extends transversely across each tread element. An area moment of inertia is associated with each of the tread elements when viewed in a direction normal to the particular sipe defined tread element. Each of the area moments of inertia have a respective pair of principle axes of inertia relative to the mid-circumferential plane. The angular orientation between any pair of respective principle axes of inertia of different sipe defined tread elements is within a predetermined angular range of 40° or less and preferably 10 degrees or less.

The tread also has a magnitude associated with each principle axis of inertia. The magnitude of any pair of respective principle axis of inertia of different sipe defined tread elements are within a predetermined range of magnitudes. The predetermined range of magnitudes is within 40 percent of less, and preferably 20 percent of less.

Each of the plurality of sipe defined tread elements has a stiffness characteristic associated therewith for resisting movement of the radially outermost surface of the tread element relative to the base of the sipe defined tread element and in a direction parallel to the mid-circumferential plane. The value of the smallest stiffness characteristic is within 40% of the value of the largest stiffness characteristic and preferably within 20%. Each of the plurality of transverse grooves has a full radial depth. The tread elements are preferably located at an axially outer edge portion of the tire.

Each of the tread elements has a respective circumferential length. A single full depth sipe extends transversely across a tread element when the circumferential length of the tread element is less than a predetermined circumferential length. At least a pair of full depth sipes extend transversely across a tread element when the circumferential length of the tread element is greater than a predetermined circumferential length.

The tread of the present invention has a void ratio which is at least 0.25 for the entire service life of the tire. The void ratio is defined as the ratio of non-contact area of the tread located between the axially limits of the rolling tread width divided by the total area of the tread located between the axially limits of the rolling tread width.

A full height contact pad is located on a trailing edge of a first tread element. A full height contact pad is located on a leading edge of a second tread element circumferentially adjacent to the first tread element for engaging the contact pad on the first tread element to limit the circumferential movement of the second tread element as the tire rotates through a contact patch. The circumferentially adjacent contact pads are spaced apart in the range of 0.1 mm to 2 mm and preferably in the range of 0.5 mm to 1.5 mm.

In a preferred embodiment of the present invention, the tread is for an all season tire. The tread comprises a plurality of circumferentially arranged first tread elements located at axially opposite ends of the tire. The tread also includes a plurality of full depth first transverse grooves. Each of the first transverse grooves separate a pair of circumferentially adjacent first tread elements. A full height contact pad is located on a trailing edge of one of the first tread elements. A full height contact pad is also located on a leading edge of another of the first tread elements circumferentially adjacent to the one first tread element for engaging the contact patch on the one first tread element to limit the circumferential movement of the first tread elements as the tire rotates through the contact patch. A plurality of circumferentially arranged second tread elements is located axially intermediate the first tread elements. A plurality of second transverse grooves is also included. Each of the plurality of second transverse grooves separates a pair of circumferentially adjacent second tread elements. A circumferential length is associated with each of the plurality of first and second tread elements. A single sipe extends transversely across a tread element when the circumferential length of that tread element is less than a predetermined circumferential length. At least a pair of sipes extend transversely across a tread element when the circumferential length of that tread element is greater than a predetermined circumferential length.

Preferably, each of the first tread elements are decoupled from circumferentially adjacent first tread elements. The second tread elements are circumferentially offset from the first tread elements. Each of the second tread elements comprises a first parallelogram portion circumferentially offset from a second parallelogram portion. Each of the sipes in the second tread elements have a radial depth substantially equal to the radial depth of the second transverse grooves at lateral edge portions of the sipe. Each of the sipes in the second tread elements has also a central portion with a radial depth substantially equal to the radial depth of the second transverse grooves.

BRIEF DESCRIPTION OF THE DRAWINGS

Further features of the present invention will become apparent to those skilled in the art to which the present invention relates from reading the following specification with reference to the accompanying drawings, in which:

FIG. 8 is a view similar to FIG. 5 illustrating relative movement of a pair of shoulder tread elements; and FIG. 9 is a cross-sectional view similar to FIG. 6 illustrating the engagement of the contact pads in circumferentially adjacent shoulder tread elements, taken approximately along line 9—9 in FIG. 8.

DESCRIPTION OF A PREFERRED EMBODIMENT

Figure 1:
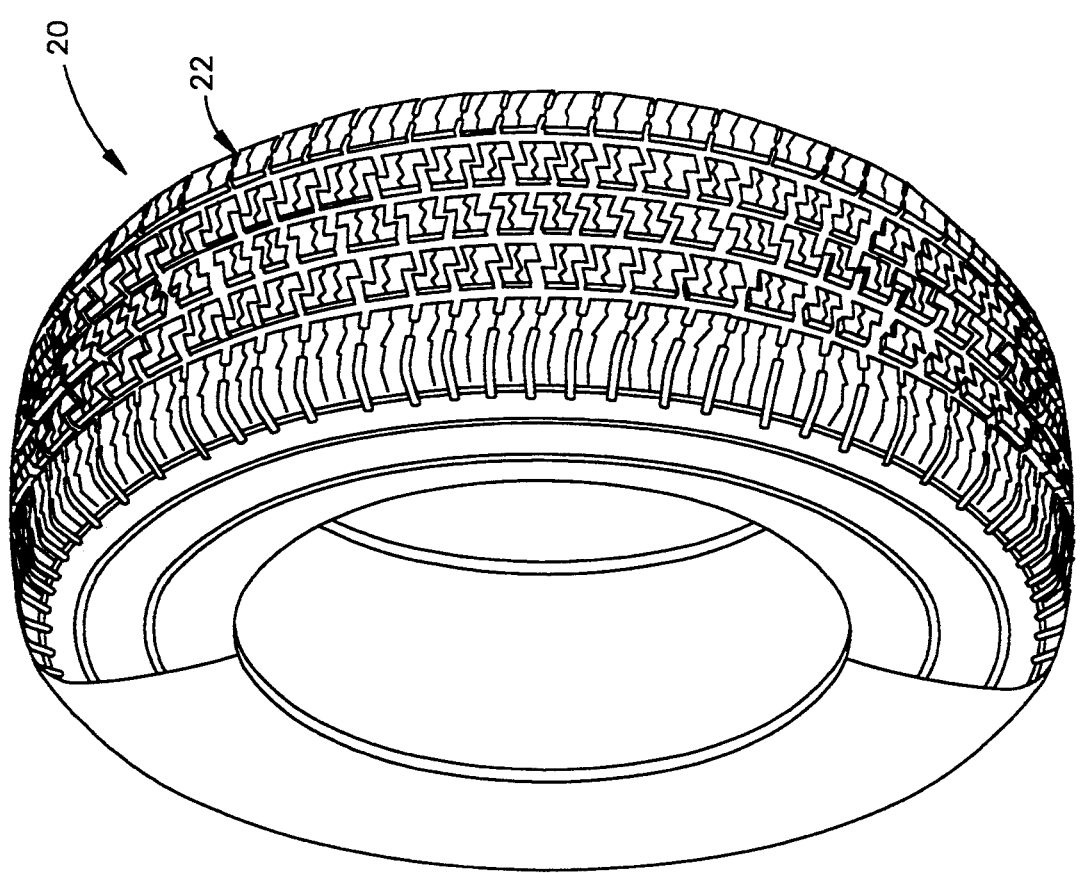
FIG. 1 is a perspective view of a tire having a tread embodying the present invention.

A tire 20 (FIG. 1) is illustrated having a tread 22 embodying the present invention. The tread 22 is disposed around the outer periphery of the tire. The tire 20 is of the all season type. The tread 22 embodying the present invention has demonstrated remarkably long wear and relatively even wear throughout the service life of the tire.

Figure 2:
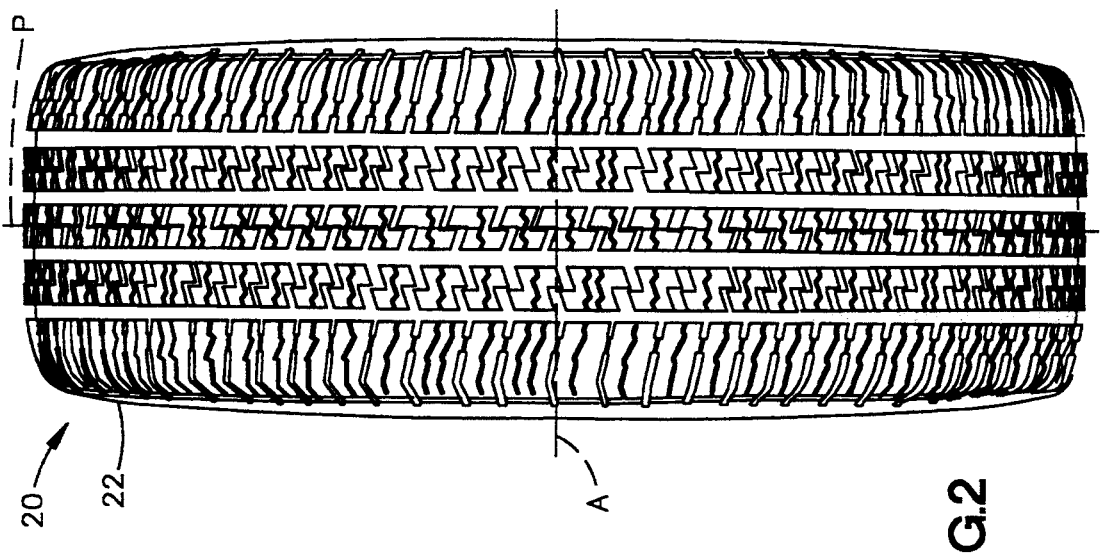
FIG. 2 is a frontal view of the tread of the tire illustrated in FIG. 1.

The tire 20 is rotatable about a longitudinal central axis A (FIG. 2). The tire 20 is bisected by a mid-circumferential plane P extending perpendicular to the axis A. The tire 20 is intended to be mounted on a rim (not shown) and properly inflated according to various parameters. The tire 20 is suitable for use on automotive vehicles in all types of weather.

Figure 3:
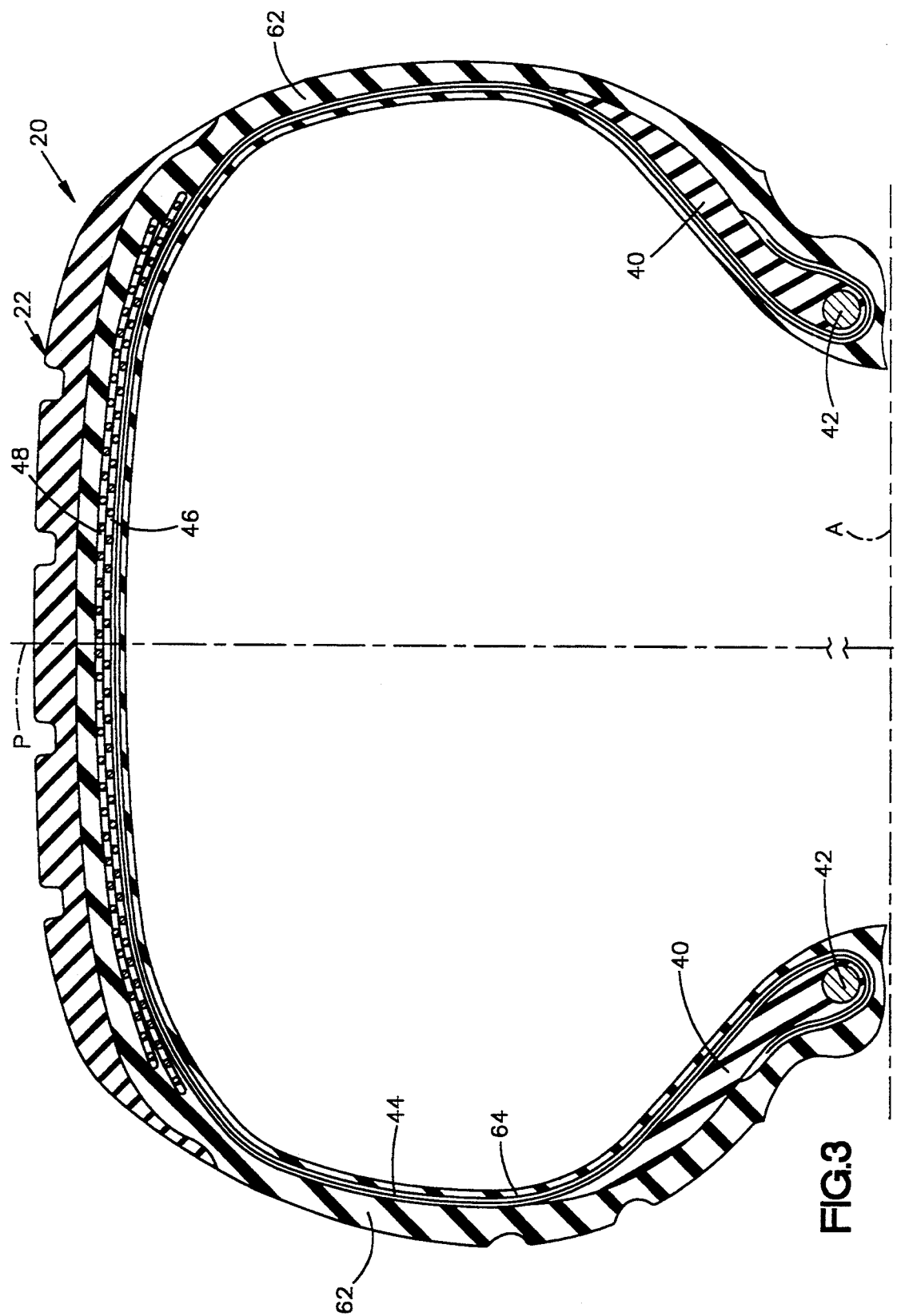
FIG. 3 is a cross-sectional view of a portion of the tire illustrated in FIG. 1.

The tire 20 includes a pair of axially spaced apart and substantially circumferentially inextensible beads 42 (FIG. 3). An apex 40 extends radially outwardly from a respective bead 42. The tire 20 has a carcass ply 44 extending between and secured at respective axially opposite end portions to a respective bead 42. The carcass ply 44 has a plurality of parallel extending reinforcing members (not shown). The reinforcing members extend in a direction substantially parallel to a radial plane extending from the axis A. A pair of annular steel belts 46,48 are located radially outwardly of the carcass ply 44.

Rubber is located outwardly of the carcass ply 44 in the sidewalls 62 of the tire 20 (FIG. 3). Rubber is also located in the tread 22 at a location radially outwardly of the belts 46 and 48. The rubber in the sidewalls 62 and the tread 22 may be the same but is preferably different for different applications. Preferably the tread 22 includes rubber having a greater durometer hardness than the rubber in the sidewalls 62. The relatively harder rubber generally resists abrasion better. The rubber in the tread 22 and sidewalls 62 may be of any suitable compound based on natural or synthetic rubber or any suitable combination thereof. The tire 20 also includes a relatively air impermeable inner liner 64.

Figure 4:
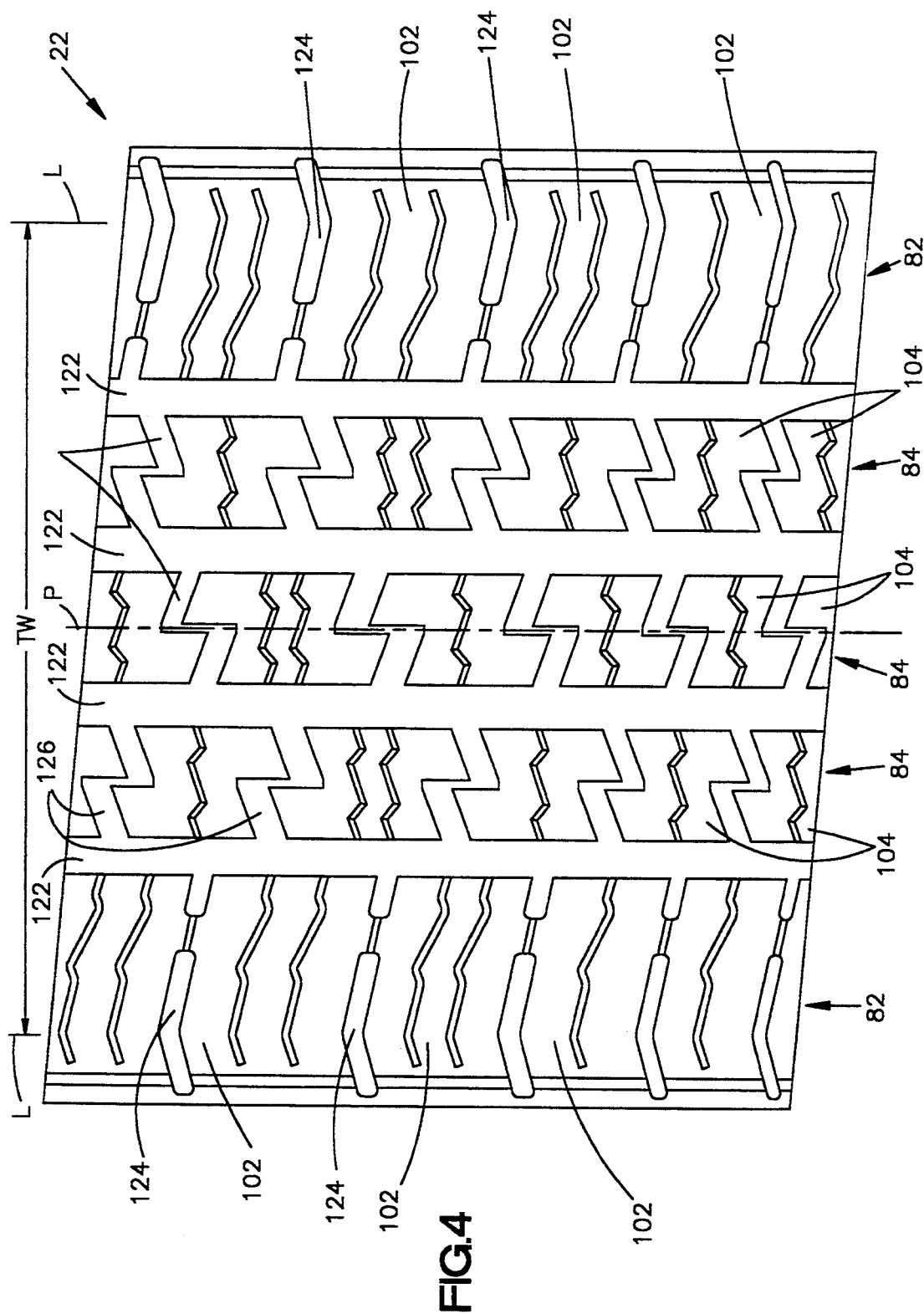
FIG. 4 is an enlarged plan view of the tread embodying the present invention.

The tread 22 of the tire 20 includes a pair of shoulder ribs 82 (FIG. 4) which are located at axially opposite end portions of the tire. The tread 22 also includes three intermediate ribs 84. However, it will be apparent that any number and configuration of intermediate ribs 84 may be employed dependent upon the size, load rating and other factors of the tire 20 and its desired application.

Each of the shoulder ribs 82 includes a plurality of tread elements 102 which are arranged in a circumferential array about the outer circumference of the tire 20. Each of the intermediate ribs 84 includes a plurality of tread elements 104 which are also arranged in a circumferential array about the outer periphery of the tire 20 at a different axial location than the tread elements 102. Each of the tread elements 102,104 engage a ground surface as the tire 20 rotates through a contact patch. Thus, all of the load transmitted between the carcass ply 44 and the ground surface is transmitted through the tread elements 102,104. The void ratio of the tread 22 is at least 0.25 for the service life of the tire and preferably at least 0.33. The void ratio is defined as the area of non-contact located between the axial limits L of the rolling tread width TW divided by the total area between the axial limits of the rolling tread width.

Each rib 82,84 is axially separated from an axially adjacent rib by a relatively wide, straight and continuous circumferential groove 122. It will be apparent that any width and configuration of the groove 122 may be used. Each tread element 102 located in a respective shoulder rib 82 is separated from a circumferentially adjacent shoulder tread element by a relatively wide and deep transversely extending groove 124. Each tread element 104 in an respective intermediate rib 84 is separated from a circumferentially adjacent intermediate tread element by a transverse groove 126. The transverse grooves 124,126 define circumferential limits of a respective tread element 102,104. The transverse grooves 124,126 may vary in configuration and size when viewed in a direction normal to the surfaces defining the grooves, for example, straight, curved or, as illustrated for the groove 126, zigzagged. The radial depth of the circumferential grooves 122 and transverse grooves 124,126 is preferably relatively equal throughout the tread 22 at a distance of about 10/32 inch. The tread 22 has axially limits L defining a rolling tread width TW as the tire 20 rotates through a contact patch. The relatively wide and deep grooves 124 extending axially inward from the axial limits L defining the rolling tread width TW enable the tire 20 to have a tread 22 according to the present invention to be labeled "all season".

It will be noted the tread elements 104 and intermediate ribs 84 are circumferentially offset from axially adjacent tread elements 104 in the intermediate ribs 84 and from the tread elements 102 in the shoulder ribs 82. This results in a relatively quiet tire as the tire 20 rotates during operation on a vehicle.

Each tread element 104 in a respective intermediate rib 84 may be of any suitable configuration when viewed in a direction normal to the radially outer surface of the tread element. In the preferred embodiment of the present invention, each tread block 104 comprises a first parallelogram portion 142 (FIG. 5) and a second parallelogram portion 144. The parallelogram portion 142 is circumferentially offset from the parallelogram portion 144. The parallelogram portions 142,144 are joined by a relatively narrow connecting portion 146. Each of the tread elements 104 thus, have a substantially Z-shaped configuration. Each tread element 102 has a substantially rectangular configuration located within the axial limit L of the rolling tread width TW.

Each of the plurality of tread elements in any single rib has a stiffness characteristic associated therewith for resisting undesirable movement of the radially outermost surface of the tread element relative to the base of the tread element. This applies in a direction parallel to the mid-circumferential plane for braking and driving forces, as well as in the lateral direction perpendicular to this plane for cornering forces. If the value of the smallest area moment of inertia is within 40 percent, and preferably less than 20 percent, of the value of the largest area moment of inertia for each direction, the resistance to treadwear is significantly improved. Similarly, if the orientation of the principle axes do not vary by more than 20 degrees, respectively, and preferably less than 10 degrees, treadwear resistance is improved. These limits apply to any shape tread element including polygonal or curvilinear configurations.

Each of the tread elements 102 in a shoulder rib 82 has a circumferential pitch length C1,C2 associated with that tread element. Likewise, each tread element 104 in a respective intermediate rib 84 has a respective circumferential pitch length C3,C4 associated with that tread element. These varied pitch lengths C1,C2,C3,C4 serve to enable a relatively quiet tire during operation because of the interference it creates among the various sound frequencies of the tread elements 102,104. The tire 20 may have any number of different circumferential pitch lengths C1,C2,C3,C4 in respective ribs 82,84. A tread element 102,104 having a relatively large circumferential pitch length will generally be more rigid or stiff in the circumferential direction than a tread element having a relatively smaller circumferential pitch length. This variability in circumferential pitch lengths often creates a variability between tread elements in their circumferential stiffnesses which is demonstrated by increased wear during normal operating conditions. The circumferential stiffness of a tread element 102,104 can be represented by a resistance to movement in a circumferential direction at a given tangential stress of a radially outer surface of a tread element relative to a base of that tread element. This stiffness can be stated in relative circumferential deflection in terms of distance units.

It was thus believed to be desirable to attempt to equalize the circumferential stiffnesses of each of the tread blocks 102,104 at least within a particular rib 82,84 and ideally over the entire tread 22 of the tire 20. One way to equalize the circumferential stiffnesses of a tread element 102,104 to within a predetermined range of stiffnesses is to vary the amount of sipes 162,164 in a respective tread element. Each of the sipes 162 in the shoulder elements 102 is what is termed a full depth sipe which can also be referred to as a narrow groove. The radial depth of the sipe 162 is substantially equal to the radial depth of a grooves 122,124,126. Thus, each sipe defined tread element 182,184 is essentially a free or independent acting tread element. When each of the circumferential pitch lengths C11,C12,C13,C14 (FIG. 8) of the sipe defined tread elements 182,184 is maintained to be within a predetermined range of circumferential pitch lengths, the circumferential stiffness or resistance to movement in the circumferential direction will be within a predetermined range.

The tread 22 of the present invention has been analyzed by various specifically developed computer models. The analysis reveals that the tread 22 according to the present invention has a relatively narrow range of circumferential stiffness variation for sipe defined tread elements 182. This range is limited to the smallest circumferential stiffness of a sipe defined tread element 182 in the shoulder rib 82 as being within 40% of the largest circumferential stiffness of a sipe defined tread elements 182. Preferably, this range is reduced even further to a maximum 20% variance from smallest to largest circumferential stiffness.

Likewise, each intermediate tread element 104 has at least two sipe defined tread elements 184. Each of the sipe defined tread elements 184 also has a relatively equal circumferential stiffness within a predetermined range. The predetermined range is similar to that for the sipe defined tread elements 182.

In order to maintain the circumferential stiffness of sipe defined tread elements in a respective rib 82,84 to within a predetermined range, the number of sipes 162,164 in a given tread element is variable. Thus, the number of sipes 162,164 in a tread element varies as a function of the circumferential pitch length C1,C2,C3,C4 of that tread element 102,104. When the circumferential pitch length C1,C2,C3,C4 is below a predetermined circumferential pitch length, the tread element 102,104 will have only one transverse extending sipe 162,164 therein. When the circumferential pitch length C1,C2,C3,C4 of the tread element 102,104 is above that predetermined circumferential pitch length at least two transverse extending sipes 162,164 will divide the tread element into smaller sipe defined tread elements 182,184.

For example, the tread element 102 having a circumferential pitch length C1 has only one transverse extending sipe 162. The tread element 102 having the larger circumferential pitch length C2 which is above the predetermined pitch length has two transverse extending sipes 162. The transverse extending sipes 162 are the full depth sipes, thus permitting the individual sipe defining tread elements 182 to act relatively independent of one another. The sipes 162,164 can be of a width in the range of 0.1 mm to 2 mm and preferably 0.5 mm to 1.5 mm. The sipes 162,164 could at least partially circumferentially close during rotation of the tire 20 through a contact patch and act to limit the circumferential movement of the sipe defined tread element 182,184 to minimize wear associated with the respective sipe defined tread element due to excessive movement over an abrasive ground surface. It is desirable for the sipes 102,104 to remain partially open to allow for water evacuation. It should be apparent that the sipes 162,164 do not have to be continuous. The sipes could be discontinuous as long as the relatively uniform stiffness of the sipe defined tread elements is maintained.

A further feature of the shoulder rib 82 is that between tread elements 102 in the shoulder ribs 82 a pair of circumferentially adjacent and facing contact pads 202L,202T are provided. The contact pads 202L,202T allow the full depth groove 124 located therebetween to engage and close during rotation of the tire 20 through a contact patch as illustrated in FIGS. 8 and 9. When the tread element 102 exits a contact patch, the sipe defined tread elements 182 are decoupled from one another and allowed to move independently and therefore reduce the amount of scrubbing on that tread element.

Figure 6:
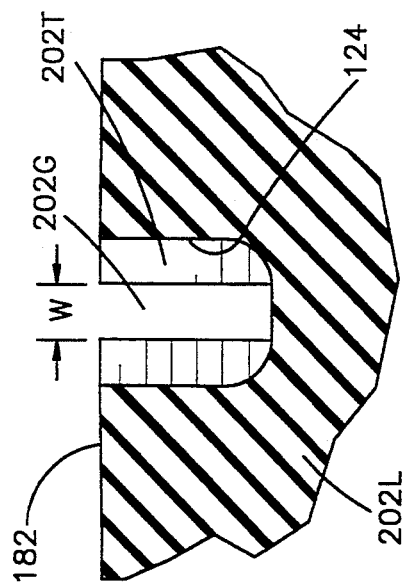
FIG. 6 is a cross-sectional view of a pair of circumferentially adjacent shoulder tread elements illustrated in FIG. 5, taken approximately along line 6—6 in FIG. 5.
Figure 5:
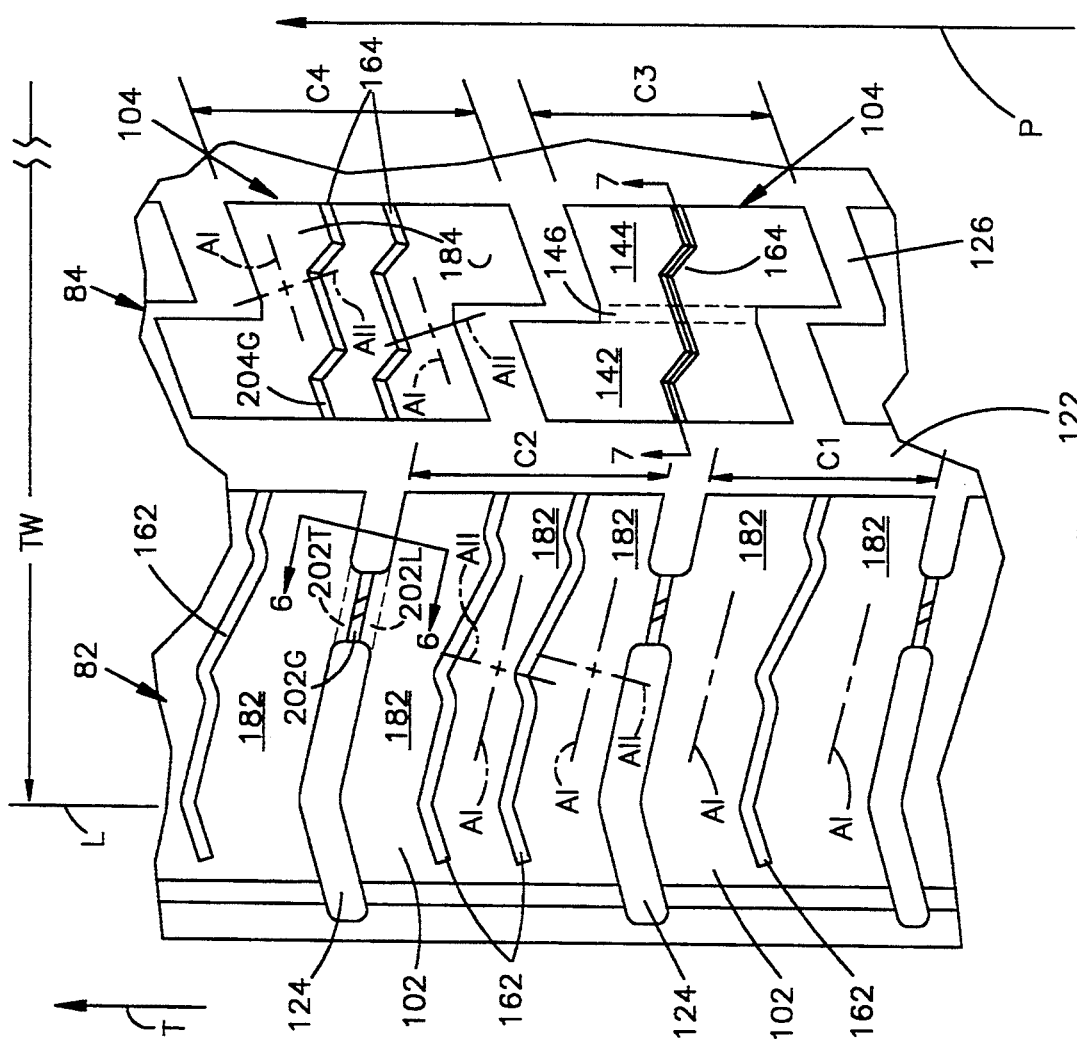
FIG. 5 is an enlarged view of several of the tread elements of the tread illustrated in FIG. 4.

A contact pad 202T is located on a trailing edge of the tread element 102 with reference to the direction of tire rotation indicated by the arrow T in FIG. 5. A contact pad 202L is located circumferentially adjacent to the contact pad 202T on a leading edge of the circumferentially adjacent tread element 102. The contact pads 202T,202L are spaced apart a distance W as illustrated in FIG. 6 which is essentially the same as the width of the sipes 162 referred to above. The depth radial of the sipe or groove 202G is substantially the same full radial depth as any of the other grooves 122,124,126. The depth of the groove 202G is referred to as a full depth groove but may include a relatively small stepped up portion or reinforcement at the bottom of the groove preferably no greater than about 2.0 mm, and preferably 1.6 mm, in order to prevent any small stones or other debris that may become wedged between the contact pads 202T,202L from being forced into the tread rubber below the grooves. This prevents such stone or debris from damaging contact with an underlying belt 46,48 or other components of the tire 20. As illustrated in FIG. 6, the sipe 202G is substantially a full depth sipe. It is equally important that the height of the contact pads 202L,202T be full height contact pads. This assures that the contact pads 202L,202T operate throughout the entire useful service life of the tire 20.

Figure 7:
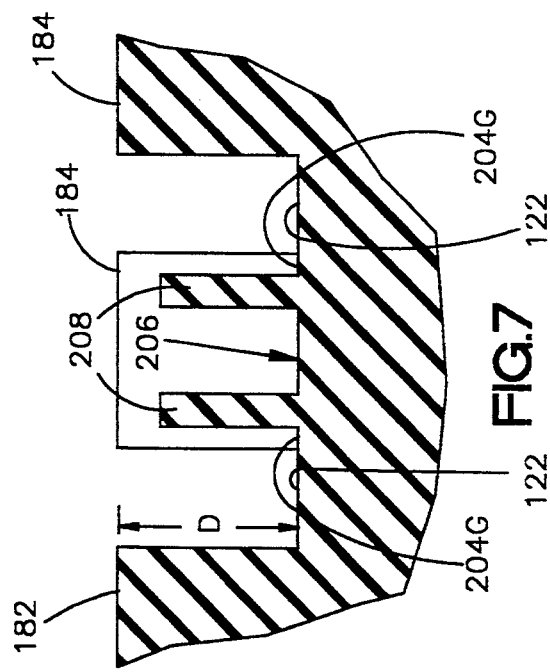
FIG. 7 is a cross-sectional view of a tread element illustrated in FIG. 5 and taken approximately along line 7—7 in FIG. 5.

Similarly, the tread elements 104 include at least one sipe 164 (FIG. 7) per tread element. The sipe 164 has a portion 204G which is a full radial depth D located at the lateral edges of the tread element 104 and at a central portion 206 of the sipe 164. This type of discontinuous transverse sipe 164 is deemed desirable because the sipe defined tread element 184 does not have the lateral width or circumferential stiffness that the sipe defined tread element 182 has. Thus, it is desirable to partially connect circumferentially adjacent sipe defined tread elements 184 by at least one and preferably two connecting portions 208. It is preferred that the connecting portions 208 do not extend upwardly to the radial outer surface of the respective tread element.

Each of the sipe defined tread elements 182,184 has an associated maximum and minimum area moment of inertia when viewed normal to the tread element. Each of the area moments of inertia have respective orthogonal principle axes of inertia which are disposed at an angle relative to the mid-circumferential plane P of the tire 20. Mathematical models developed on a computer have determined that optimal uniform stiffness in the sipe defined tread elements 182,184 produces uniform wear throughout the sipe defined tread elements in a respective rib and eventually in the entire tread.

There are numerous considerations used to define tread element size and shape limits which result in acceptable wear, noise, wet and dry traction, snow and ice traction, handling, ride comfort and the like performance. Various physical parameters of each tread element, as well as the relationships between elements, are considered by those skilled in tire tread design. The additional parameters and interrelationships disclosed in the present invention must also be considered in seeking an optimum tread design, especially for improved resistance to treadwear.

An important physical parameter of a tread element is its area moment of inertia. This moment of inertia relates to the stiffness of each sipe defined tread element in both magnitude and orientation. There are two principle orthogonal axes of inertia AI, AII for each sipe defined tread element which define maximum and minimum magnitude of the area moments of inertia and, therefore, maximum and minimum stiffness axes. One objective of present invention is to limit the variation in the magnitude of the area moments of inertia for all the sipe defined tread elements in each rib. A second objective is to align the respective orthogonal principle axes AI,AII at approximately the same orientation for all the sipe defined tread elements in each rib.

Uniform stiffness results in an area moment of inertia of the largest sipe defined trend element 182A,184A and the smallest sipe defined tread element 182B,184B (FIG. 8) which differ by not more than 40 percent, and preferably less than 20 percent, for each of the maximum and minimum magnitudes.

Each of the sipe defined tread elements 182,184 also has orthogonal principle axes that locate that orientation as an angle with respect to the mid-circumferential plane P of the maximum and minimum area moments of inertia, when viewed normal to the tread element (FIG. 8). Computer models have also determined that optimal uniform principle axes orientation in the siped defined tread elements 182,184 result in uniform wear from element to element within each rib and eventually on the entire tread.

Relatively uniform orientation form the mid-circumferential plane P results in the angle 103,105 of the largest sipe defined tread element 182A,184A and the angle 203,205 of the smallest sipe defined tread element 182B,184B to differ by not more than 20°, and preferably less than 10°, for all principle axis orientations. This limit also applies for any sipe defined tread element which may have a larger or smaller principle axes orientation with respect to the mid-circumferential plane P than the largest or smallest sipe defined tread element. A tire having a tread 22 embodying the present invention has been tested. The results of the test indicates that the tire 20 has 30% of its starting radial tread depth D at the equivalent of 100,000 miles of service. The tire having a tread embodying the present invention has achieved a UTQG rating in the range of 480 to 520, depending on size of the tire.

From the above description of a preferred embodiment of the invention, those skilled in the art will perceive improvements, changes and modifications. Such improvements, changes and modifications within the skill of the art are intended to be covered by the appended claims.

Having described a preferred embodiment of the invention, what is claimed is:

1. A tread when in an annular configuration for a tire, having a mid-circumferential plane, said tread comprising:
   a plurality of tread elements arranged in a circumferential array about the tire to form a shoulder rib, wherein respective tread elements have a non-zero pitch length variation;
   a plurality of transverse extending grooves, each of said grooves separating a pair of circumferentially adjacent tread elements and defining the circumferential pitch length for each of said plurality of tread elements;
   a single full depth sipe extending transversely across a tread element when the circumferential pitch length of said tread element is less than a predetermined circumferential pitch length; and
   at least a pair of full depth sipes extending transversely across a tread element when the circumferential pitch length of said tread element is greater than the predetermined circumferential pitch length, wherein the tread has both tread elements with the single sipe and tread elements with at least the pair of sipes; and
   an area moment of inertia associated with the sipe defined tread elements in the shoulder rib when viewed in a direction normal to the tread element, each of said area moments of inertia having orthogonal principle axes of inertia relative to the mid-circumferential plane, the angular orientation between any pair of respective principle axes of inertia of different sipe defined tread elements being within a predetermined angular range of 40 degrees or less and each of said area moments of inertia associated with each one of said principle axes having a magnitude, wherein the magnitude of a smallest moment of inertia is within 40 percent of a largest moment of inertia for the sipe defined tread elements in each shoulder rib circumferential array.

2. The tread set forth in claim 1 wherein the predetermined angular range is 10 degrees or less.

3. The tread set forth in claim 1 wherein said area moments of inertia have a range of the magnitudes for each one of the pair of respective principle axes of 20 percent or less.

4. The tread set forth in claim 1 wherein each of said plurality of sipe defined tread elements has a stiffness characteristic for resisting movement of the radially outermost surface of said tread element relative to a base of said tread element in a direction parallel to the mid-circumferential plane, the value of the smallest stiffness characteristic being within 40% of the value of the largest stiffness.

5. The tread set forth in claim 4 wherein the value of the smallest stiffness characteristic is within 20% of the value of the largest stiffness.

6. The tread set forth in claim 4 wherein said tread further comprises: means for equalizing the circumferential stiffness of each of said plurality of sipe defined tread elements to within a predetermined range, wherein said means includes one full depth sipe located in a tread element when the circumferential stiffness of the tread element is below a predetermined value and at least a pair of full depth sipes located in a tread element when the circumferential stiffness is above a predetermined value.

7. The tread set forth in claim 1 wherein each of said plurality of transverse grooves has a full radial depth.

8. The tread set forth in claim 1 wherein said plurality of tread elements is located at an axial outer edge portion of the tread.

9. The tread set forth in claim 1 wherein the void ratio of the tread is at least 0.25 for the service life of the tire, the void ratio being defined as the ratio of non-contact area located between the axial limits of the rolling tread width divided by total area located between the axial limits of the rolling tread width.

10. The tread set forth in claim 1 wherein all circumferentially adjacent tread elements further comprise:
    a full height contact pad located on a trailing edge of a first tread element; and
    a full height contact pad located on a leading edge of a second tread element, said second tread element circumferentially trailing said first tread element, wherein the two contact pads are in contact as the tire rotates through a contact patch.

11. The tread for a tire set forth in claim 1, wherein the tread further comprises an intermediate rib having a second area moment of inertia associated with each sipe defined tread element located between a full depth sipe and a respective transverse groove defining each tread element in the intermediate rib when viewed in a direction normal to the tread element, each of said second area moments of inertia having orthogonal principle axes of inertia relative to the mid-circumferential plane, the angular orientation between any pair of respective principle axes of inertia of different sipe defined tread elements being within a predetermined angular range of 40 degrees or less and each of said second area moments of inertia associated with each one of said principle axes having a magnitude wherein the magnitude of the smallest second moment of inertia is within 40 percent of a largest second moment of inertia for the sipe defined tread elements in each intermediate rib.

12. A tread when in an annular configuration for a tire, having a mid-circumferential plane, said tread comprising;
    a plurality of tread elements, including the tread elements of a shoulder rib and an intermediate rib, arranged in circumferential arrays about the tire, wherein respective tread elements in each rib have a non-zero pitch length variation;
    a plurality of transverse extending grooves, each of said grooves separating a pair of circumferentially adjacent tread elements and each adjacent pair being spaced apart a predetermined distance;
    a single full depth sipe extending across tread elements when the predetermined distance is less than a first predetermined value;

at least two full depth sipes extending across a tread element when the predetermined distance is greater than the first predetermined value;

an area moment of inertia associated with all sipe defined tread elements in the shoulder rib when viewed in a direction normal to the tread element, each of said area moments of inertia having orthogonal principle axes of inertia with an angular orientation of said axes relative to the mid-circumferential plane within a predetermined angular range, wherein the magnitude of a smallest moment of inertia is within forty (40) percent of a largest moment of inertia for the sipe defined tread elements; and a pair of full height contact pads on each one of the tread elements in the shoulder rib, wherein one contact pad is located on the leading edge and the other contact pad is located on the trailing edge of said each one of the tread elements.

* * * * *